(12) United States Patent     (10) Patent No.:   US 12,594,695 B2

Huang et al.     (45) Date of Patent:     Apr. 7, 2026

(54) INJECTION MOLD INSERT AND MANUFACTURING METHOD FOR INJECTION MOLD INSERT

(71) Applicants: Tyco Electronics (Suzhou) Ltd., Suzhou City (CN); Tyco Electronics (Shanghai) Co., Ltd., Shanghai (CN)

(72) Inventors: Zhongxi Huang, Shanghai (CN); Dan (Nico) Li, Shanghai (CN); Sheng (Neo) Wu, Suzhou (CN)

(73) Assignees: Tyco Electronics (Suzhou) Ltd., Suzhou City (CN); Tyco Electronics (Shanghai) Co., Ltd., Shanghai (CN)

( * ) Notice: Subject to any disclaimer, the term of this patent is extended or adjusted under 35 U.S.C. 154(b) by 144 days.

(21) Appl. No.: 18/202,724

(22) Filed: May 26, 2023

(65) Prior Publication Data

US 2023/0382016 A1    Nov. 30, 2023

(30) Foreign Application Priority Data

May 27, 2022   (CN) .......................... 202210593036.X

(51) Int. Cl.
| | |
|---|---|
| *B29C 45/26* | (2006.01) |
| *B29C 33/38* | (2006.01) |
| *B33Y 80/00* | (2015.01) |

(52) U.S. Cl.
CPC ...... *B29C 33/3828* (2013.01); *B29C 33/3842* (2013.01); *B29C 45/26* (2013.01); *B33Y 80/00* (2014.12); *B29K 2905/10* (2013.01); *B29K 2905/12* (2013.01)

(58) Field of Classification Search
CPC ...... B29C 33/3828; B29C 2045/14147; B29C 2045/14057
See application file for complete search history.

(56) References Cited

U.S. PATENT DOCUMENTS

2020/0232592 A1*   7/2020   Ma ........................... B22F 12/53
2022/0016711 A1*   1/2022   Seleznev ................... B22F 7/08

* cited by examiner

*Primary Examiner* — Adam Krupicka
(74) *Attorney, Agent, or Firm* — Barley Snyder

(57) ABSTRACT

An injection mold insert includes a housing of a first material and an inner core of a second material sealed in the housing of the first material. A mechanical strength of the first material is greater than that of the second material. The thermal conductivity of the second material is greater than that of the first material. The inner core is formed by filling a molten liquid of the second material into an inner cavity of the housing.

7 Claims, 6 Drawing Sheets

11(1)

100'

2

10(1)

11(1)

INJECTION MOLD INSERT AND MANUFACTURING METHOD FOR INJECTION MOLD INSERT

CROSS-REFERENCE TO RELATED APPLICATION

This application claims the benefit of the filing date under 35 U.S.C. § 119(a)-(d) of Chinese Patent Application No. 202210593036.X, filed on May 27, 2022.

FIELD OF THE INVENTION

The present invention relates to an injection mold insert and a manufacturing method for the injection mold insert.

BACKGROUND

In prior art, a connector product typically consists of a terminal and a plastic housing. The plastic housing is usually formed by injection molding that uses an injection mold insert to form the plastic housing. The molding cycle of the injection molding process is crucial to the production efficiency of the connector housing. In the injection molding cycle, the cooling time often accounts for the vast majority of the entire molding cycle, sometimes even accounting for more than 50% of the molding cycle. Therefore, effectively reducing cooling time while ensuring product quality and production stability is crucial to reducing the molding cycle.

In the prior art, the injection mold insert is usually made of steel. In order to improve the cooling efficiency of the injection mold insert, it is often necessary to form cooling channels in the injection mold insert, such as water-cooling channels. However, for the connector housing with complex structures, it is often difficult for the cooling water path to reach some hot spots of the injection mold insert, resulting in poor cooling effectiveness in the hot spots, which affects the quality and molding cycle of the connector housing. In addition, for the connector housing with more complex structures and smaller space, sometimes the hot spot area does not have enough space for processing cooling channels, resulting in poor cooling effectiveness in the hot spot area, reducing the injection molding cycle of the product.

SUMMARY

An injection mold insert includes a housing of a first material and an inner core of a second material sealed in the housing of the first material. A mechanical strength of the first material is greater than that of the second material. The thermal conductivity of the second material is greater than that of the first material. The inner core is formed by filling a molten liquid of the second material into an inner cavity of the housing.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
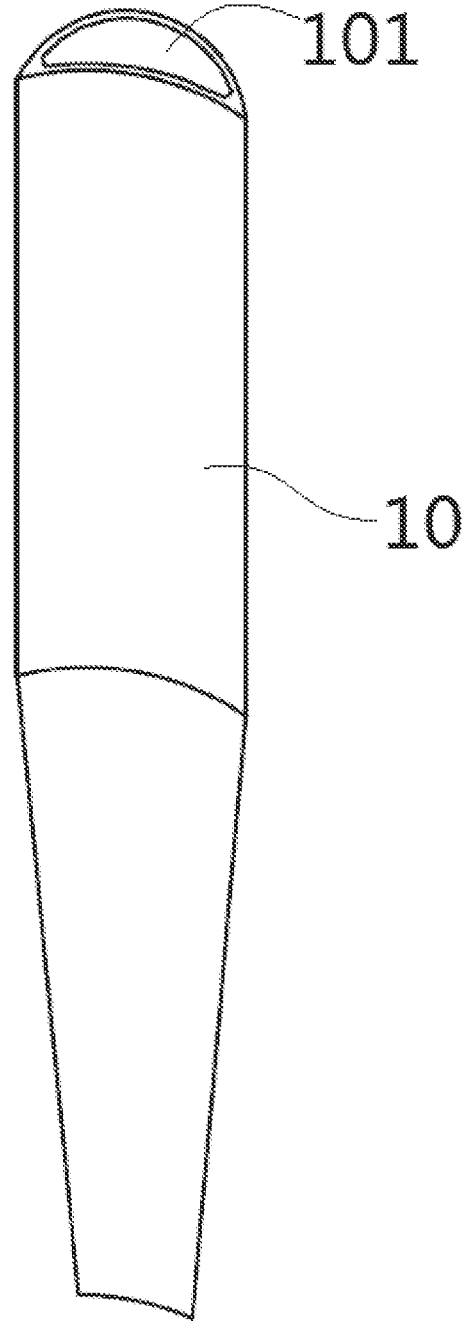
FIG. 1 is a perspective view of a main part of an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
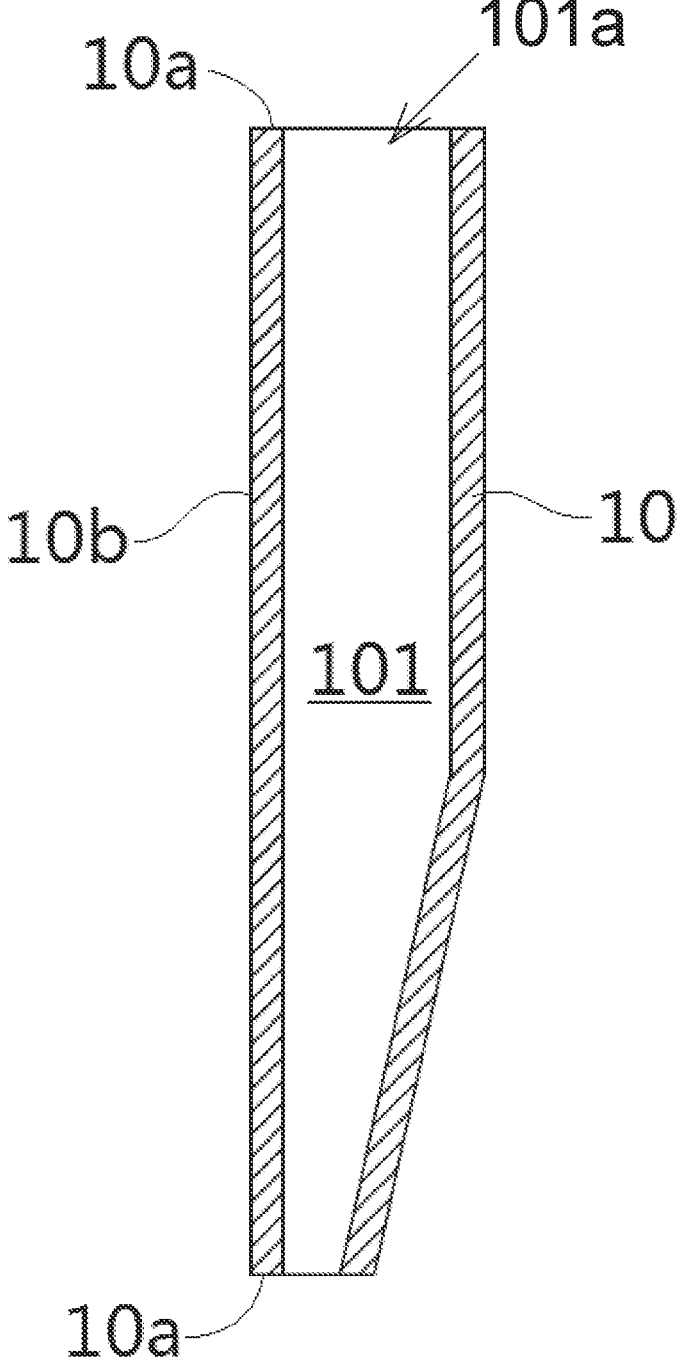
FIG. 2 is a sectional side view of the main part.
Figure 3:
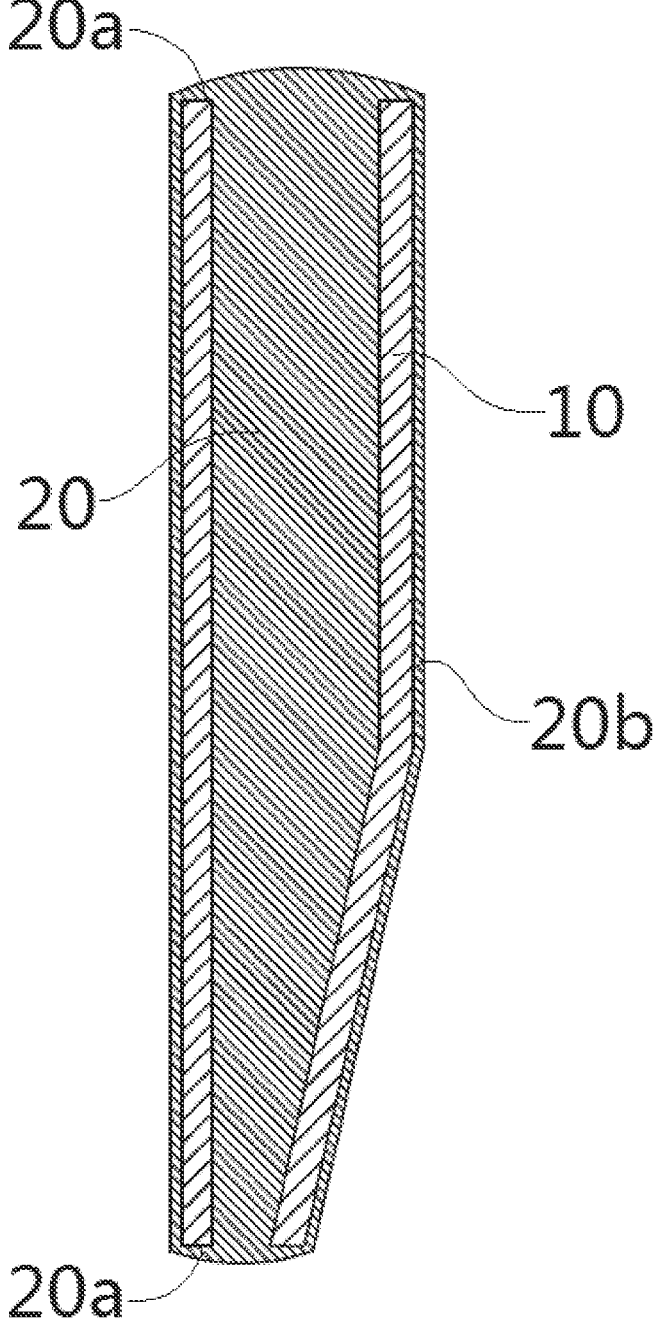
FIG. 3 is a schematic diagram of pouring molten second material into an inner cavity of the main part.
Figure 4:
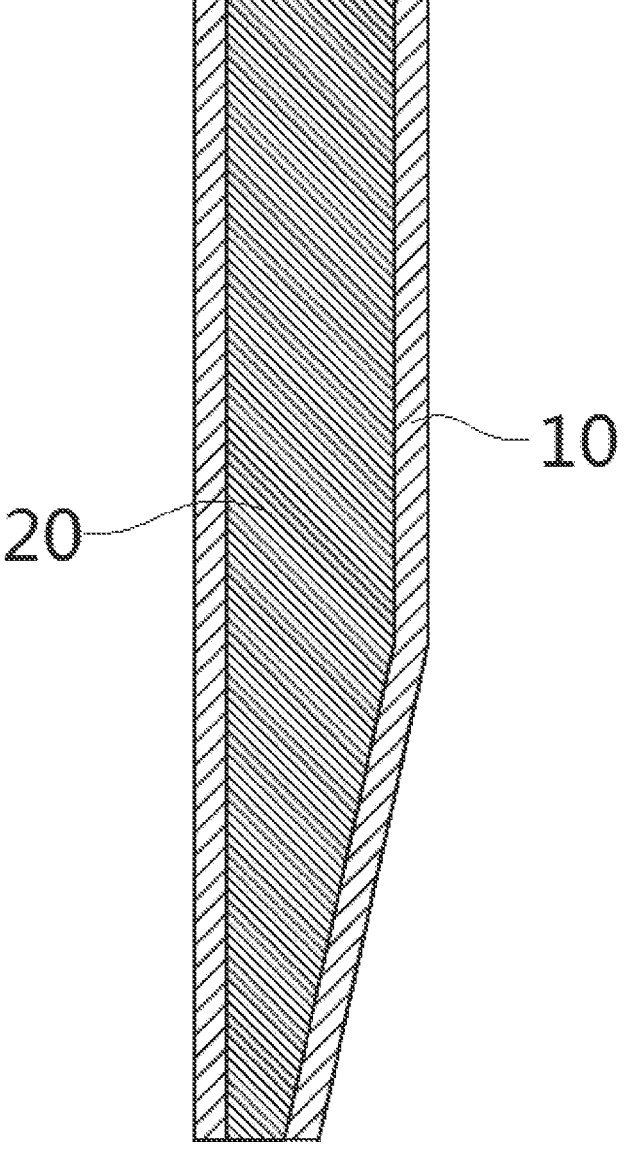
FIG. 4 is a schematic diagram after removing the excess second material from the exterior of the main part shown in FIG. 3.
Figure 5:
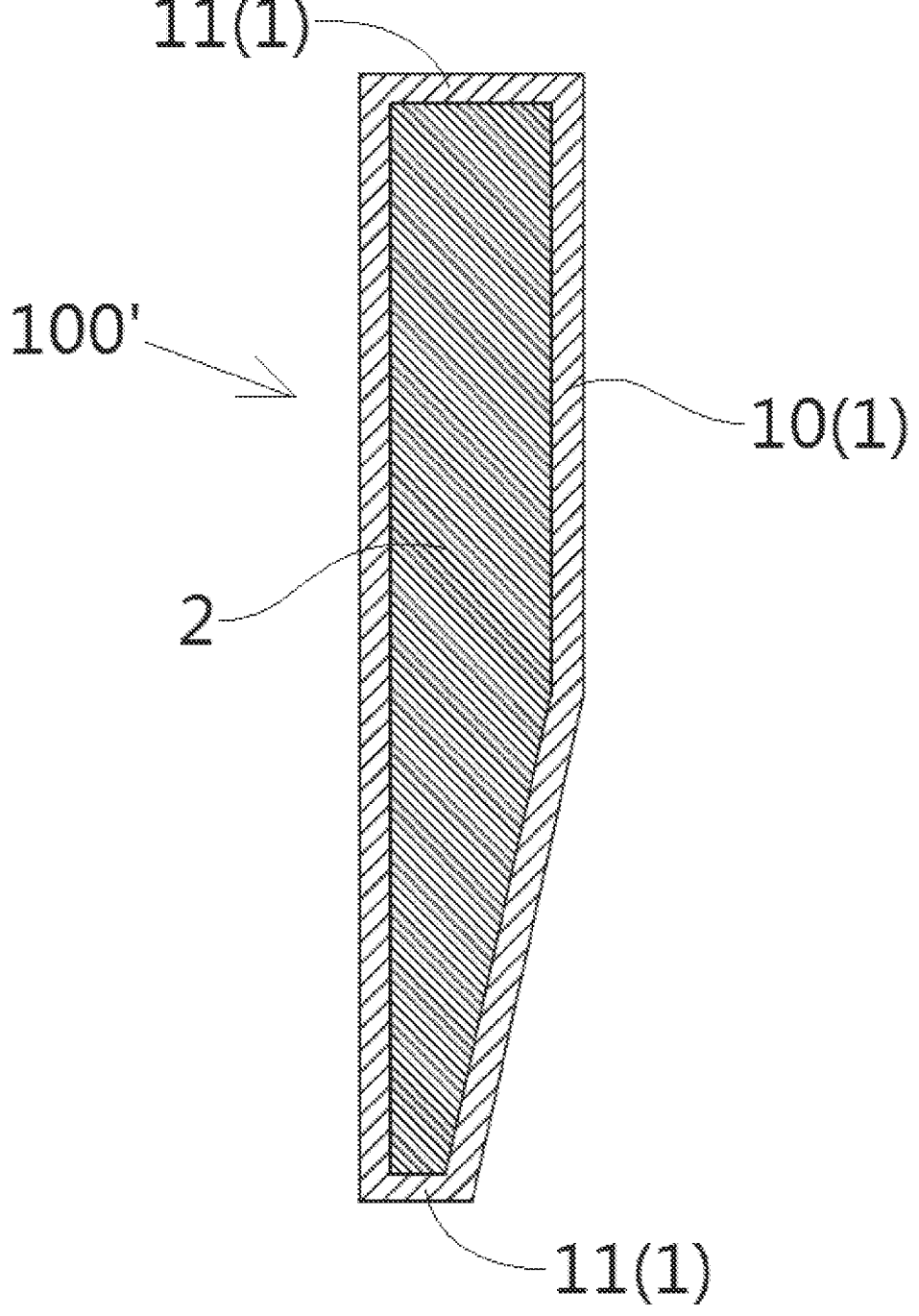
FIG. 5 is a schematic diagram of forming a cover part on an opening of the main part shown in FIG. 4 to cover the opening on the main part.
Figure 6:
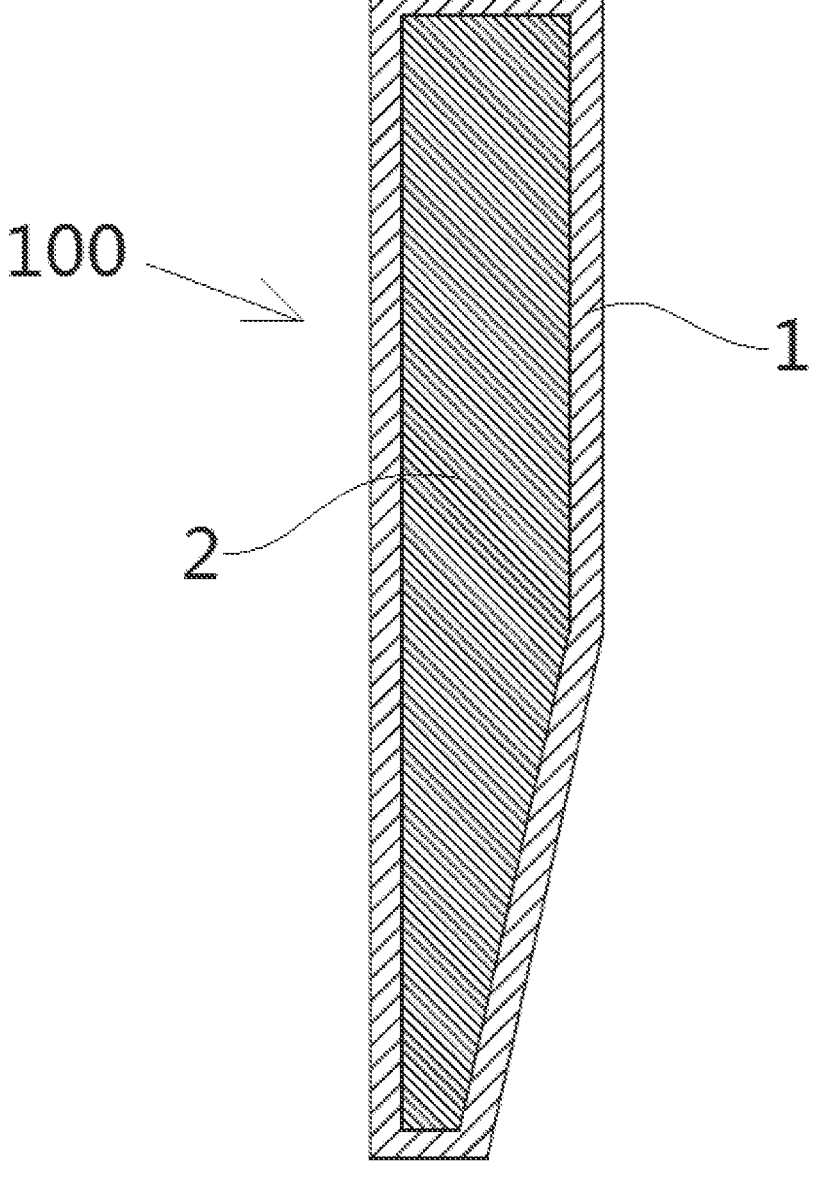
FIG. 6 shows a schematic diagram of an injection mold insert formed after heat treatment and precision machining of the mold piece shown in FIG. 5.

FIG. 1 shows an illustrative perspective view of the main part 10 according to an exemplary embodiment of the present invention. FIG. 2 shows a longitudinal cross-sectional view of the main part 10 according to an exemplary embodiment of the present invention. FIG. 3 shows a schematic diagram of pouring molten second material 20 into the inner cavity 101 of the main part 10 shown in FIGS. 1 and 2. FIG. 4 shows a schematic diagram after removing the redundant second materials 20a and 20b from the exterior of the main part 10 shown in FIG. 3. FIG. 5 shows a schematic diagram of a cover part 11 formed on the main part 10 shown in FIG. 4 to close the opening 101a on the main part 10. FIG. 6 shows a schematic diagram of an injection mold insert 100 formed after heat treatment and precision machining of the mold piece 100' shown in FIG. 5.

As shown in FIGS. 5 and 6, in the illustrated embodiment, the injection mold insert mainly comprises a housing 1 of a first material and an inner core 2 of a second material. The inner core 2 of the second material is sealed in the housing 1 of the first material. The mechanical strength of the first material is superior to that of the second material, and the thermal conductivity of the second material is superior to that of the first material. For example, the thermal conductivity of the second material can be higher than 70 W/m. K.

As shown in FIGS. 3 to 6, in the illustrated embodiment, the inner core 2 is formed by filling molten second material liquid into the inner cavity 101 of the housing 1. Therefore, the present invention simplifies the manufacturing process of the injection mold insert 100 and reduces the manufacturing cost of the injection mold insert 100. In addition, the heat in the hot spot area inside the injection mold insert 100 can be transferred more quickly to the outside through the highly conductive inner core 2, greatly improving the cooling efficiency of the injection mold insert 100.

In an embodiment, the first material is mold steel, the second material is copper, and the inner core 2 is formed by pouring molten copper liquid into the inner cavity 101 of the housing 1, as shown in FIG. 3.

As shown in FIG. 5, the housing 1 includes a main part 10 and a cover part 11. The main part 10 has an inner cavity 101 and an opening 101*a*, shown in FIG. 2, communicating with the inner cavity 101. The cover part 11 closes the opening 101*a* of the main part 10. During the formation of the inner core 2, the molten second material liquid is poured into the inner cavity 101 of the main part 10 through the opening 101*a* on the main part 10. The opening 101*a* is formed on the end surface 10*a* of the end portion of the main part 10 and/or the side surface of the side portion of the main part 10.

During the formation of the inner core 2, the main part 10 is immersed in the molten second material liquid, so that the molten second material liquid is poured into the inner cavity 101 of the main part 10. However, the present invention is not limited thereto, and other suitable methods can be used to pour molten second material into the inner cavity 101 of the main part 10.

After forming the inner core 2, a cover part 11, shown in FIG. 5, is formed on the main part 10 to close the opening 101*a* on the main part 10. In this way, the entire inner core 2 is sealed in the housing 1.

In an exemplary embodiment, the main part 10 and the cover part 11 may be formed by 3D printing. For example, the main part 10 can be formed by direct metal laser sintering printing or selective laser melting printing. The cover part 11 can be formed by graft printing.

In the illustrated embodiment, the main part 10 has longitudinal and transverse dimensions, and the maximum cross-sectional dimension of the main part 10 is less than 4 mm, 3 mm, 2 mm, or 1 mm.

The manufacturing method according to an exemplary embodiment of the present invention will be described below with reference to FIGS. 1 to 6. The method may include the following steps:

S10: As shown in FIGS. 1 and 2, a main part 10 is provided, which is made of a first material and has an inner cavity 101 and an opening 101*a* communicating with the inner cavity 101;

S20: As shown in FIG. 3, molten second material is poured into the inner cavity 101 of the main part 10 through the opening 101*a*; and S30: As shown in FIGS. 4 and 5, a cover part 11 of the first material that closes the opening 101*a* on the main part 10 is provided on the main part 10 to obtain a mold piece 100'.

In the illustrated embodiment, the mechanical strength of the first material is superior to that of the second material, and the thermal conductivity of the second material is superior to that of the first material. The mold piece 100' includes: a closed housing 1 composed of the main part and the cover part 11, and an inner core 2 formed by the second material 20 poured into the main part 10.

In the illustrated embodiment, the first material is mold steel, the second material is copper, and the inner core 2 is formed by pouring molten copper liquid into the inner cavity 101 of the main part 10.

In the illustrated embodiment, in the step S20, the main part 10 is immersed in molten second material liquid, so that the inner cavity 101 of the main part 10 is fully filled with the molten second material.

As shown in FIGS. 3 and 4, prior to step S30, redundant second materials 20*a* and 20*b* attached to the exterior of the main part 10 are removed. The main part 10 includes an end surface 10*a* and a side surface 10*b*. As shown in FIGS. 3 and 4, before step S30, the excess second material 20*a* attached to the end surface 10*a* of the main part 10 and the excess second material 20*b* attached to the side surface 10*b* are cut off, and the end surface 10*a* of the main part 10 is ground flat.

In an embodiment, the manufacturing method of the aforementioned injection mold insert also includes a step:

S40: Heat treating the obtained mold piece 100' to increase the hardness of the housing 1.

In an embodiment, the first material is mold steel, and step S40 includes:

S41: Heat treating the mold piece 100' at 1070° C. for 30 to 60 minutes; and S42: After cooling the mold piece 100', heat treating the mold piece 100' at a temperature of 570° C. for 3 hours.

In this way, after two heat treatments, the surface hardness of the housing 1 can reach 48-54 HRC.

After step S40, the outer surface of the mold piece 100' is precisely machined to obtain an injection mold insert 100 with a predetermined shape and size.

In an embodiment, the main part 10 and the cover part 11 may be formed by 3D printing. For example, the main part 10 can be formed by direct metal laser sintering printing or selective laser melting printing. The cover part 11 can be formed by graft printing.

It is possible to simultaneously provide multiple main parts 10 in the step S10, and simultaneously pour molten second material liquid into multiple main parts 10 in the step S20. In this way, manufacturing efficiency can be improved.

In the illustrated embodiment, the manufacturing process of the injection mold insert is as follows:

According to the design of injection mold inserts, design a hollow main part 10 and design an appropriate outer frame. Due to the small size of the main parts (such as diameter<4 mm, or even <1 mm), the wall thickness of the main parts can be appropriately increased, and multiple main parts can also be designed on a single base at the same time, facilitating the production of multiple main parts at one time. And add appropriate machining allowance for the main part design. Use 3D printing to print out the designed structure. 3D printing can be performed using either DMLS (Direct Metal Laser Sintering) or SLM (Selective Laser Melting) processes.

Use a heating furnace to melt pure copper at high temperatures, using an electric furnace or medium frequency electromagnetic induction heating furnace, and using a graphite crucible to hold copper.

Slowly immerse the printed steel main part into the molten pure copper liquid, and as the copper liquid rises above the top of the main part, slowly lift the main part out of the pure copper liquid level. Due to the cooling and sealing of the raised part, the pure copper filled inside has been cooled due to the smaller pipe diameter and the upper end, preventing the internal copper from flowing down when taken out.

After cooling, cut off the machining allowance at both ends of the main part and perform end grinding.

Using the graft printing method, the cover parts 11 that close the end openings are printed on the two end surfaces of the main parts 10 respectively, and a post-processing allowance is reserved.

Heat treatment process: heat treat the above obtained mold piece 100' at 1070 degrees Celsius for 30-60 minutes. After cooling, heat treatment at 570° C. for 3 hours was conducted to achieve hardening of the mold steel. Finally, the surface hardness reaches 48-54 HRC.

After heat treatment, the mold piece 100′ is machined to achieve the desired structure and size of the injection mold insert 100.

The present invention has the following advantages, not all of which are required in every embodiment of the present invention:

In the present invention, 3D printing combined with copper melt pouring, machining, and heat treatment can achieve the production of pure copper molds for steel ladle.

Conveniently realizing the mold manufacturing with pure copper as the inner core and steel as the outer housing. High thermal conductivity, high mold surface hardness, and wear resistance.

Molten copper pouring not only realizes the combination of copper and steel, and is suitable for the manufacture of copper clad steel molds with complex structures, but also for the manufacture of small size and high thermal conductivity mold inserts.

The 3D grafting printing process achieves the sealing and combination of pure copper and steel materials.

The scheme of the present invention is easy to achieve the production of high thermal conductivity mold inserts with small dimensions or complex structures.

The thermal conductivity of a mold has an important impact on the injection molding cycle and product performance. The thermal conductivity of commonly used injection mold insert steel is 20-30 W/m. K. Conventional manufacturing schemes, even 3D printing schemes, are difficult to achieve the production of high thermal conductivity molds with pure copper ladle structures, especially for mold inserts with small dimensions or complex structures. The present invention provides a scheme for producing a high thermal conductivity mold for ladle copper using pure copper as an inner core structure using 3D printing combined with molten pure copper perfusion, as well as machining and heat treatment processes. In various embodiments, the present invention includes first printing a hollow mold body using mold steel material, immersing the print into molten pure copper liquid for perfusion, then machining the insert filled with pure copper, and then printing the remaining structure by grafting printing to tightly seal the real pure copper piece in the steel housing. The sintering of steel and copper is achieved through two-step heat treatment to improve the hardness of the steel. Finally, a machining scheme is used to finish the surface of the mold piece to become the final required mold piece. This scheme is different from the existing direct energy deposition 3D printing method for printing bimetallic parts that cannot print pure copper. At the same time, it can achieve the manufacturing of high thermal conductivity mold inserts that cannot be achieved by other methods for smaller sizes.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An injection mold insert, comprising:

a housing of a first material, the housing includes a main part having an inner cavity and an opening communicating with the inner cavity, and a cover part covering the opening of the main part, a maximum cross-sectional dimension of the main part is less than 4 mm; and an inner core of a second material sealed in the housing of the first material, a mechanical strength of the first material is greater than that of the second material, the thermal conductivity of the second material is greater than that of the first material, the inner core is formed by filling a molten liquid of the second material into the inner cavity of the housing, the molten liquid of the second material is poured into the inner cavity of the main part through the opening of the main part during the formation of the inner core.

2. The injection mold insert according to claim 1, wherein the first material is mold steel, the second material is copper, and the inner core is formed by pouring the molten liquid copper into the inner cavity of the housing.

3. The injection mold insert according to claim 1, wherein in a process of forming the inner core, the main part is immersed in the molten liquid such that the molten liquid is poured into the inner cavity of the main part.

4. The injection mold insert according to claim 1, wherein after forming the inner core, the cover part is formed on the main part to cover the opening on the main part.

5. The injection mold insert according to claim 1, wherein the main part and the cover part are formed by 3D printing.

6. The injection mold insert according to claim 5, wherein the main part is formed by a direct metal laser sintering printing or a selective laser melting printing, and the cover part is formed by graft printing.

7. The injection mold insert according to claim 1, wherein the opening is formed on an end surface of an end portion of the main part and/or a side surface of a side portion of the main part.

\* \* \* \* \*